United States Patent [19]
Guyton

[11] 3,746,964
[45] July 17, 1973

[54] POWER SUPPLY SYSTEM FOR HEAVY TRACTION LOADS

[75] Inventor: William V. Guyton, Clackamas, Oreg.

[73] Assignee: Sol-Tek Industries, Inc., Troutdale, Oreg.

[22] Filed: Jan. 4, 1971

[21] Appl. No.: 103,724

[52] U.S. Cl..................... 321/5, 318/332, 318/434, 321/14
[51] Int. Cl.............. H02m 1/18, H02m 7/20, H02k
[58] Field of Search......................... 321/5, 11–14, 321/18, 27, 47; 318/332, 432, 433, 434; 307/202, 252 P, 252 Q; 317/335 C; 323/4, 9

[56] References Cited
UNITED STATES PATENTS

| | | | |
|---|---|---|---|
| 3,445,751 | 5/1969 | Easter | 323/9 |
| 3,467,848 | 9/1969 | Ainsworth | 321/14 |
| 3,569,810 | 3/1971 | Thiele | 318/434 X |
| 3,582,746 | 6/1971 | Nye et al. | 318/434 X |
| 3,462,754 | 8/1969 | Kelley | 317/33 SC |
| 2,760,142 | 8/1956 | Hitchcock | 321/27 R |
| 3,005,945 | 10/1961 | Salzer | 321/11 |
| 3,584,282 | 6/1971 | Reeves et al. | 318/332 |
| 3,355,653 | 11/1967 | Paradisses | 321/14 |
| 3,383,579 | 5/1968 | Hung | 321/14 X |

OTHER PUBLICATIONS

GE SCR Manual, "Co–ordination of Protective Elements" 3rd Edition, p. 237, 1964.

*Primary Examiner*—William H. Beha, Jr.
*Attorney*—Buckhorn, Blore, Klarquist and Sparkman

[57] ABSTRACT

A power supply system for conversion of three phase alternating current to direct current utilizes a plurality of silicon controlled rectifiers for controlling output current and providing a current limiting function. Current limiting circuitry phases back conduction in the silicon controlled rectifiers when an overload occurs, but response of the circuit is non-linear to prevent loss of control and oscillation in the case of heavy fault currents. Separate fuses are connected in series with each of plural paralleled silicon controlled rectifiers to promote load sharing, and for removing improperly fired silicon controlled rectifiers from the circuit without shut-down of the entire supply.

3 Claims, 4 Drawing Figures

WILLIAM V. GUYTON
INVENTOR

BY BUCKHORN, BLORE, KLARQUIST & SPARKMAN
ATTORNEYS

WILLIAM V. GUYTON
INVENTOR

BY
BUCKHORN, BLORE, KLARQUIST & SPARKMAN
ATTORNEYS

POWER SUPPLY SYSTEM FOR HEAVY TRACTION LOADS

BACKGROUND OF THE INVENTION

Some difficulty is experienced in rectification of alternating currents for supplying traction motors and the like because of the magnitude of load current involved. Control of the output current is desirable, not only from the standpoint of adjustability, but also from the standpoint of limiting excessive current. Silicon controlled rectifiers are found advantageous in this respect, but are difficult to obtain in sizes suitable for handling large currents. A larger surge current rating is obtainable by paralleling a plurality of smaller silicon controlled rectifiers. However, some means must then be employed in order to insure the paralleled silicon controlled rectifiers will share the load equally. Thus, load sharing resistances have been employed in series with a plurality of paralleled silicon controlled rectifiers for properly distributing the load current. Notwithstanding the use of such resistances, one of a plurality of silicon controlled rectifiers may be improperly triggered or be conductive at a time when others in the same parallel circuit are not triggered, whereby an excessive current is drawn, and failure of the rectifier results. Also, if the particular silicon controlled rectifier drawing excessive current fails in a conducting condition, it may present a short circuit load to other rectifiers in the same polyphase circuit, cuasing further circuit failure. Alternatively, the main circuit breaker or fuse may operate, removing the entire power supply from service, and resulting in expensive down-time.

Another difficulty encountered in conventional power supplies employing silicon controlled rectifiers or the like, arises when transient overloads or short circuit loads are encountered. Silicon controlled rectifiers are "phased back" in conventional circuits to conduct less current when an overload is detected. This conventional current limiting process will operate properly when the load current fairly gradually increases. However, in the event of a very rapid "crow-bar" short or heavy overload, the silicon controlled rectifiers will nonetheless continue to provide high output currents the remainder of a given half-cycle of conduction. Meanwhile, the detected load current is apt to drive the input of the current limiting circuit into saturation in an effort to turn off the silicon controlled rectifiers. As a consequence, the silicon controlled rectifiers will be shut off during the next positive half-cycle, with zero load current resulting. As the current limiting circuit comes out of saturation, and zero load current is detected, the silicon controlled rectifiers are turned full-on again, supplying excessive current. The usual result is destructive oscillation, or else removal of the circuit from the line through the operation of main circuit breakers or fuses.

SUMMARY OF THE INVENTION

In accordance with an aspect of the present invention, each silicon controlled rectifier of a paralleled combination is fused separately by means of fuse elements having a finite resistance and a positive temperature coefficient of resistance, for thereby bringing about load sharing between the rectifiers. The fuses also operate to remove a particular silicon controlled rectifier when the same is improperly triggered, thereby preventing destruction of the silicon controlled rectifier and/or a short circuit load upon other system rectifiers. Moreover, only the faulty rectifier or rectifiers are removed, and circuit operation is not interrupted.

In accordance with another aspect of the invention, a current limiting circuit detects excessive transient output currents for bringing about phasing-back of silicon controlled rectifiers, or other control valve means. The circuit is normally responsive to provide current limiting for moderately large output currents, or slowly applied output currents, but the response of the circuit according to the present invention is reduced in the case of high load current values, whereby shut-off of the control valve means and oscillation of the system is prevented. In a circuit according to a specific embodiment, the current limiting circuit comprises an amplifier having a non-linear gain characteristic.

It is therefore an object of the present invention to provide an improved power supply circuit adapted to supply heavy direct current loads.

It is another object of the present invention to provide an improved heavy duty power supply circuit adapted to remain operative under heavy load conditions, without injury to the equipment or the ultimate power source.

It is a further object of the present invention to provide an improved power supply circuit adapted for powering traction motors and the like.

It is a further object of the present invention to provide an improved current limiting circuit for a power supply.

It is another object of the present invention to provide an improved power supply current limiting circuit which is stable in its operation under high overload conditions.

It is a further object of the present invention to provide an improved circuit for paralleling silicon controlled rectifiers.

It is another object of the present invention to provide an improved heavy duty power supply circuit employing silicon controlled rectifiers, which circuit is inexpensive in construction and efficient in operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
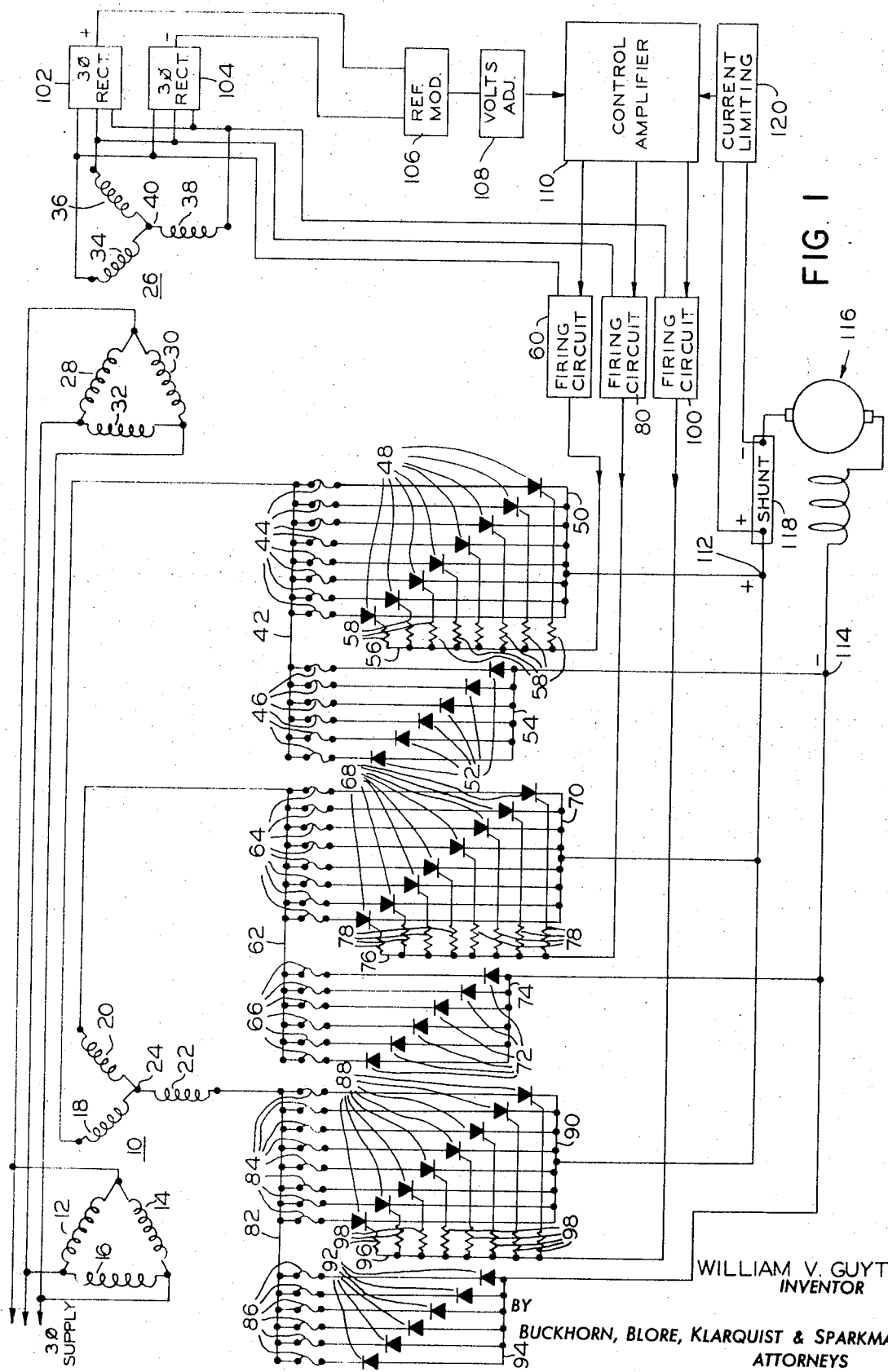
FIG. 1 is a schematic diagram of a power supply according to the present invention, partially in block diagram form.

Referring to the drawings, and particularly to FIG. 1, a power supply constructed in accordance with the present invention is illustrated partially in block diagram form. An input power transformer 10 has delta-connected primary windings 12, 14, and 16 coupled to a three phase supply. The transformer 10 also includes wye-connected secondary windings 18, 20, and 22, joined at a common neutral point 24. A control transformer 26 is also coupled to the same three phase input wherein the primary of transformer 26 comprises delta-connected windings 28, 30, and 32, with the secondary comprising wye-connected windings 34, 36, and 38 having common neutral point 40. The primary winding connections for trnasformers 10 and 26 are such that the three phase outputs derived from windings 34, 36, and 38 are in phase with the outputs provided at similar terminals of windings 18, 20, and 22, respectively.

For the sake of illustration, the voltage output provided at the non-neutral terminal of winding 18 will be considered as the phase-1 voltage, with the voltage provided by windings 20 and 22 comprising the phase-2 and phase-3 voltages respectively. The phase-1 voltage is coupled to a common bus 42, to which are connected a plurality of first fuses 44 and a plurality of second fuses 46. The function and characteristics of these fuses will be hereinafter described in greater detail. Fuses 44 couple bus 42 to the anode terminals of the same number of silicon controlled rectifiers 48, which comprise suitable control valve means in accordance with the present invention. The cathode terminals of silicon controlled rectifiers 48 are connected togetehr at bus 50, and since the rectifiers are capable of conducting current in the anode-to-cathode direction, bus 50 will provide a positive rectified output relative to the alternating current input supplied from winding 18. It will be seen the silicon controlled rectifiers are disposed in parallel between buses 42 and 50.

Conduction of silicon controlled rectifiers 48 is under the control of gate terminals connected respectively to bus 56 by way of resistors 58, employed for assuring that the gate of each silicon controlled rectifier receives its share of turn-on current. Such turn-on current is provided by firing circuit 60 connected to bus 56.

Fuses 46 couple bus 42 to the cathode terminals of diodes 52, the anodes of which are joined by bus 54 whereby diodes 52 are also connected in parallel. Bus 54 provides a negative terminal since the diodes conduct in the opposite direction from silicon controlled rectifiers 48.

Similarly, phase-2 winding 20 of the power transformer 10 is coupled to bus 62, to which is connected a plurality of first fuses 64 and a plurality of second fuses 66. The function and characteristics of these fuses will also be hereinafter described. Fuses 64 couple bus 62 to the anode terminals of silicon controlled rectifiers 68, comprising further control valve means in accordance with the present invention. The cathode terminals of silicon controlled rectifiers 68 are connected togetehr at bus 70, bus 70 also providing a positive rectified output from the input supplied at winding 20.

Conduction of silicon controlled rectifiers 68 is controlled by the gate terminals thereof connected respectively to bus 76 by resistors 78, which divide the turn-on current between these gate terminals. Turn-on current is provided by firing circuit 80 connected to bus 76. Fuses 66 couple bus 62 to the cathode terminals of diodes 72, the anodes of which are joined at bus 74. A negative voltage is thus provided at bus 74.

Furthermore, phase-3 winding 22 is coupled to bus 82 joined to a plurality of first fuses 84 and a plurality of second fuses 86. Fuses 84 couple bus 82 to anode terminals of silicon controlled rectifiers 88. Cathode terminals of silicon controlled rectifiers 88 are connected together at bus 90, which bus therefore provides a positive output. Conduction of silicon controlled rectifiers 88 is under the control of gate terminals thereof, connected respectively to bus 96 by way of resistors 98, employed for current dividing purposes. The turn-on current therefor is provided by firing circuit 100 connected to bus 96. Fuses 86 are employed to couple bus 82 to cathode terminals of diodes 92, the anodes of which are joined at negative bus 94.

Positive buses 50, 70, and 90 are joined at positive output terminal 112 while the negative buses 54, 74, and 94 are connected in common to the negative output terminal 114. Between the output terminals, in the instance of the present example, there is connected a series motor 116, with a shunt 118 being serially interposed between a positive terminal 112 and the positive terminal of the motor. Shunt 118 has quite a low resistance, but provides an output voltage thereacross which is accurately proportional to the current flowing in the series motor. This voltage from shunt 118 is supplied as an input to current limiting circuit 120 which affects the operation of control amplifier 110, in a manner hereinafter more fully described, under heavy load conditions.

The output terminals of secondary windings 34, 36, and 38 of control transformer 26 are coupled to three-phase, positive and negative rectifiers 102 and 104 which supply power to control circuits according to the present invention. These rectifier circuits also supply a voltage standard via reference module 106, the output of which is adjustably selectable via voltage adjustment means 108 for providing a reference input to control amplifier 110. Control amplifier 110 operates firing circuits 60, 80, and 100 in conjunction with the proper phase inputs derived from windings 34, 36, and 38, respectively, whereby the firing circuits trigger operation of silicon controlled rectifiers 48, 68, and 88 at the proper times in the alternating current input cycle. Thus, since a three-phase power input is present at the secondary of power transformer 10 (and assuming the phase sequence as hereinbefore indicated) silicon controlled rectifiers 48, 68, and 88 will be successively operated at approximately 120 degree intervals relative to the AC power input. Thus, for example, when the anodes of silicon controlled rectifiers 48 become positive relative to neutral terminal 24, triggering of silicon controlled rectifiers 48 by firing circuit 60 will become possible, for providing current to bus 50. Firing circuit 60 receives an input from control transformer secondary winding 34, enabling the firing circuit to trigger silicon controlled rectifiers 48 at the time when both windings 18 and 34 supply a positive voltage relative to the common neutral. Control amplifier 110 may, however, delay the firing for a period of time which will change the average current supplied to bus 50. Thus, if a higher average current output is desired, voltage adjustment means 108 is set so that control amplifier 110 will cause firing circuit 60 to trigger silicon controlled rectifiers 48 fairly early in the positive half-cycle delivered to the anodes thereof. If lower average current is desired, means 108 is adjusted whereby control amplifier 110 will cause firing circuit 60 to fire silicon controlled rectifiers 48 in slightly later phase relation. Operation of firing circuits 80 and 100 is similar, but in proper phase as well understood by those skilled in the art. Paralleled diodes provide a return circuit path when cathodes thereof are negative with respect to neutral.

In the foregoing operation, the fuses in series with the silicon controlled rectifiers, e.g. fuses 44 connected in series with anode terminals of silicon controlled rectifiers 48, perform two functions. These fuses have a finite, although rather low, resistance, and also are characterized by a positive temperature coefficient of resistance. Therefore, these fuses perform the function of load-sharing resistances, whereby the silicon controlled rectifiers 48 are obliged to carry substantially equal currents. Except for this resistance, silicon controlled rectifiers in parallel would usually not operate properly. The silicon controlled rectifiers have a negative temperature coefficient of resistance. Therefore, the silicon controlled rectifier in a parallel circuit having a slightly lower resistance would carry more current, its resistance would drop with increased temperature, further aggravating its taking an undue proportion of the current in the parallel circuit. The condition avalanches whereby one or more silicon controlled rectifiers would fail. It is known to place resistances in series with paralleled silicon controlled rectifiers in order to correct this situation by the addition of a positive-temperature-coefficient-of-resistance means. The present fuses 44, in addition to supplying the needed resistance, also perform an additional function of providing "dynamic" load-sharing, or continued load sharing when an SCR operates improperly.

Thus, even when conventional load sharing resistances are used, a given silicon controlled rectifier in a parallel circuit may carry a disproportionate amount of the total current, resulting in failure of the rectifier and possible failure of the power supply. In the case of a rectifier which fails on, i.e. fails in a conducting condition, rectification action no longer takes place, and a short circuit results across other portions of the power supply. For instance, if one of silicon controlled rectifiers 48 were to become continuously conducting, such unit would provide a short circuit load for silicon controlled rectifiers 68 and 88. Prior power supply circuits have met this problem by merely providing a fuse means or circuit breaker in the line, which takes the entire system out of service in the case of such a failure. In the present system, in the event of over-current in an individual silicon controlled rectifier, the corresponding fuse opens, for example one of the fuses 44, which not only protects the individual silicon controlled rectifier, but also maintains the system in operating condition. As occasional misfiring of the silicon controlled rectifier takes place, or a silicon controlled rectifier becomes faulty causing such silicon controlled rectifier to carry an undue proprotion of the current, fuse 44 will remove such unit without interfering with the operation of the rest of the circuit. It is therefore preferred that a greater number of silicon controlled rectifiers be provided in a given phase than are needed to serve the maximum rated load anticipated. For instance, it is desirable that twice as many silicon controlled rectifiers 48 be provided as would carry the particular phase load to motor 116. Occasional failure of a unit will then have no effect on system operation. Of course, fuses 44 are rated to break the circuit to an individual silicon controlled rectifier 48 at a current slightly less than the rated current of the individual rectifier. In a specific instance, silicon controlled rectifiers 48 were each rated at 40 amperes, while fuses 44 may be rated at 30 amperes. The fuses are fast operating, designed to break the circuit in less than a cycle, and each had a resistance in a particular instance of 0.01 ohm. The fuses were silver element fuses having a positive temperature coefficient of resistance of two-tenths of one percent per degree Centigrade. This silver fuse gives the desired resistance characteristics at high current levels.

While only eight silicon controlled rectifiers and fuses therefor are illustrated per phase in the drawing, this number was chosen for convenience of illustration only. In a particular example, 16 silicon controlled rectifiers were employed per phase with 12 diodes being utilized instead of six utilized per phase. A fewer number of diodes can be employed inasmuch as the silicon controlled rectifiers have a greater power dissipation as a result of their gating or switching operation, which, of course, does not occur in the case of the diodes. The fuses in series with the diodes, such as fuses 46, may be of the same type as fuses 44 but have a proportionately larger current rating commensurate with the smaller number thereof.

Thus, the fuses in series with the silicon controlled rectifiers provide dynamic load balancing, by not only supplying the positive resistance desired, but also by removing a silicon controlled rectifier which is temporarily triggered or incorrectly operated such that it carries an inordinate amount of current. The fuses not only protect the load and the three-phase input supply from surges, as in the case of prior art fusing and circuit breaking apparatus, but also protect the individual silicon controlled rectifiers themselves. This enables the paralleling of smaller silicon controlled rectifiers rather than requiring a single, expensive silicon controlled rectifier for each phase.

As an additional advantage of the parallel combination of silicon controlled rectifiers, the failure of one silicon controlled rectifier, e.g. in a failed-on condition, temporarily protects the other silicon controlled rectifiers in the same parallel combination. Thus, in the case of a short transient over-voltage or overload condition, a single or possibly two silicon controlled rectifiers will bear the brunt of the surge whereby the remainder and paralleled therewith are protected. The number of silicon controlled rectifiers thus disconnected by fuses is usually low because of the resistance of leads, inductance of the transformer windings, etc.

The fuses 44, for instance, are desirably coupled in series with the anode terminals of silicon controlled rectifiers 48, rather than with the cathodes thereof as has been the case with prior art current sharing resistors. The reason for this connection is that the interruption of a series circuit by a fuse in the cathode circuit would have a deleterious effect upon the firing circuit. Thus, in the case of a disconnected SCR cathode lead, firing circuit 60 would have its output connected to transformer secondary winding 18. Therefore, the placement of the fuses in the anode leads more advantageously removes the undesired silicon controlled rectifier from the circuit.

The paralleled silicon controlled rectifier circuit made possible in accordance with the present invention provides a higher surge rating than would be possible with a single silicon controlled rectifier as presently available. Thus, a single large silicon controlled rectifier device typically has a one cycle surge rating of no more than about 7,000 amps. With paralleled SCR's, each having a surge rating of 1,000 amps, for example, a larger overall surge rating is readily possible. For instance, in the example given above where 16 SCR's were employed per phase, the combined surge rating is 16,000 amps, or more than double that available if employing a single SCR per phase. Moreover, of course, a single large silicon controlled rectifier is presently much more expensive than a plurality of smaller ones paralleled according to the present invention. As may also be apparent, the paralleled silicon controlled rectifiers according to the present invention need not be chosen with closely matched characteristics inasmuch as the series fuses will tend to eliminate units which will not operate satisfactorily in parallel with other units, while leaving a sufficient number of silicon controlled rectifiers in parallel to handle the load adequately. Naturally, of course, fuses and/or silicon controlled rectifiers may be replaced when convenient, e.g. at a time when the power supply is not called upon for continuous operation.

The motor 116 is typically employed as a traction motor as used in material handling devices or electric powered vehicles such as lift trucks or the like. Such equipment can at times represent an inordinately high load to the rectifier system. For instance, such equipment may encounter frequent instances where the motor is substantially stalled as when a lift truck meets an "immovable object". For this and other reasons, the power supply circuit may be subject to an occasional "crow-bar" short. Under these circumstances, inordinately high load currents harmful to both supply and motor would exist, possibly resulting in actuation of a main supply breaker (not shown) or fuse, substantially disconnecting the apparatus, unless some means is provided to limit load current. As hereinbefore mentioned, load current from the present supply is detected by means of shunt 118, while current limiting circuit 120 is responsive thereto for reducing heavy load currents. Then, when voltage detected across shunt 118 by current limiting circuit 120 reaches a predetermined level, control amplifier 110 causes later operation of circuits 60, 80, and 100, triggering silicon controlled rectifiers 48, 68, and 88 at a later time in their positive anode cycle. According to a feature of the present invention, this current limiting circuit also includes non-linear means for reducing the response of the current limiting circuit, in the case of predetermined high current values, in order to forestall oscillation of the power supply. Thus, the amplification which may be provided in the current limiting circuit 120 and/or control amplifier 110 is reduced at predetermined high current levels, higher than levels at which the current limiting starts to operate, to prevent an "over-reaction" to heavy fault currents.

Heretofore, circuit limiting circuits of this general type have been effective for limiting current so long as load current did not rapidly approach a high level. Thus, for example, a conventional circuit would be designed for "phasing back" silicon controlled rectifiers 48, 68, and 88 by the maximum amount when some high current value was reached, say 300 amperes in the case of a power supply normally designed to provide 100 amperes. The conventional system may also operate successfully to limit the current if a larger fault were slowly applied. However, in the case of a rapidly applied crow-bar short, the conventional system tends to over-react. A sudden extremely large load current of, say 1,000 amperes for a power supply designed normally to supply 100 amperes, would establish a higher voltage across a shunt such as illustrated at 118 than would normally be required for relatively complete phase-back of the silicon controlled rectifiers 48, 68, and 88. A circuit such as one employing silicon controlled rectifiers does not react immediately, since devices of this type lose control when conducting. As a consequence, the fault would have an opportunity to build up and over-drive or saturate current limiting circuit 120, keeping in mind circuit 120 is sensitive enough to react to a voltage across a low resistance shunt. As a result, the silicon controlled rectifiers will be substantially shut off on their next positive halfcycle. No current will then pass through shunt 118, and no input voltage will then be provided as an input to current limiting circuit 120. Current limiting circuit 120, theretofore saturated by the fault surge, comes out of saturation at a time determined by the circuit's time constant, allowing the silicon controlled rectifiers to operate full-on. At such time the fault, if still present, will again provide a large voltage output across shunt 118 and the cycle repeats. Destructive oscillation frequently results, whereby this conventional current limiting arrangement is incapable of responding and protecting the overall power supply circuit against the worst type of fault condition. Consequently, many conventional circuits are provided with fusing or circuit breakers which disable the power supply in the case of a crow-bar fault or the like. Unfortunately this renders a traction device power supply unreliable and unsuitable for continued heavy duty operation. However, in the circuit of the present invention, wherein the reaction of the current limiting circuit is reduced at current levels above the value at which maximum phase-back is desirably achieved, saturation and over-reaction of the current limiting circuit, resulting in shut-off of current and consequent oscillation, is prevented. The current limiting circuit according to the present invention, the control amplifier, a firing circuit, and attendant apparatus are illustrated in greater detail in FIG. 2.

Figure 2:
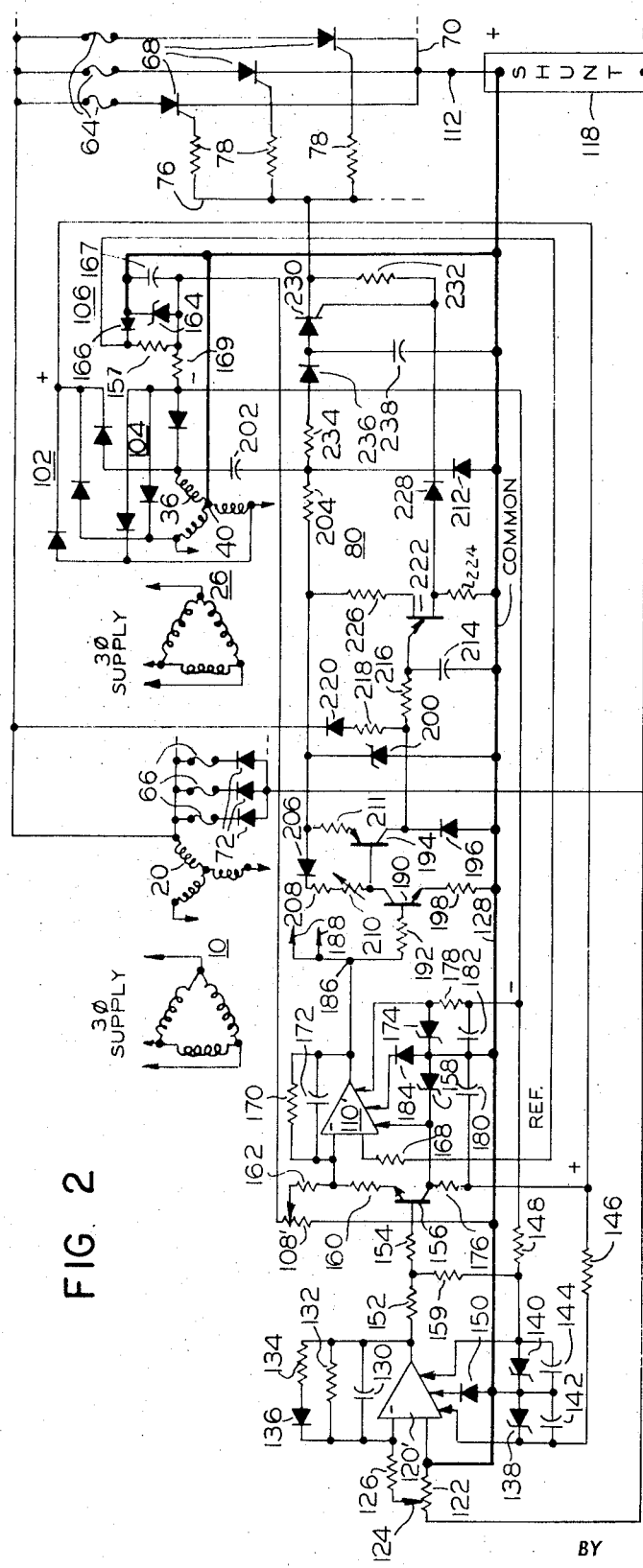
FIG. 2 is a schematic diagram of a portion of the FIG. 1 circuit, particularly illustrating current-limiting features.
Figure 4:
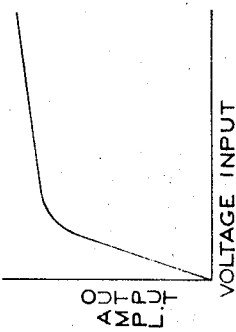
FIG. 4 is a graph of current-limiting circuit output, versus voltage applied thereto.

Referring to FIG. 2, wherein similar elements are referred to employing similar reference numerals, current limiting amplifier 120' receives an input from shunt 118 connected in series with motor 116. Amplifier 120' is a differential operational amplifier and may comprise a multistage amplifier circuit. It corresponds to circuit 120 in FIG. 1. Potentiometer 122 connected across the shunt has a movable tap 124 coupled by way of resistor 126 to the inverting input terminal of the differential amplifier 120'. The remaining input terminal of amplifier 120', as well as the remaining shunt terminal, are connected to common bus 128. The amplifier 120' is provided with a feedback capacitor 130 shunted by resistor 132, and also shunted by resistor 134 in series with diode 136. Diode 136 has its anode connected to the negative or inverting input of amplifier 120' and operates to permit a first gain for amplifier 120' for input voltages below a given level, with a different and much lower gain being provided for input voltages above a given level which cause diode 136 to conduct. Thus, in a typical instance, amplifier 120' has a gain of about 100 for inputs below 0.06 volts, and a gain of about one for inputs above 0.06 volts. The 0.06 volt level will correspond to near the input value resulting in the maximum phase-back point for the silicon controlled rectifiers. This non-linear feedback circuit prevents over-response and saturation resulting from a fast crow-bar short or the like as hereinafter more fully discussed. The non-linear response or gain of amplifier 120' is illustrated in FIG. 4. As can be seen, output increases for voltage inputs up to the point where diode 136 conducts, at the knee of the curve, after which output increases much less rapidly.

The feedback capacitor 130 smooths out the response of the amplifier somewhat, but allows the amplifier to detect the general voltage level for each cycle of current passing through shunt 118.

A power supply for amplifier 120' includes serially connected Zener diodes 138 and 140 shunted respectively by capacitors 142 and 144. The cathode of Zener diode 138 is coupled through resistor 146 to the positive terminal of three phase rectifier 102 while the anode of Zener diode 140 is coupled via resistor 148 to the negative terminal of three phase rectifier 140. The midpoint between the Zener diodes is coupled to common bus 128 connected to control transformer secondary neutral 40, as well as to the anode of diode 150 having its cathode coupled to a circuit point in amplifier 120' preventing this amplifier from ever having a negative output excursion. Suitably, the cathode of diode 150 is connected to clamp a driver stage of the operational amplifier against negative excursions.

The output of amplifier 120' is coupled via resistors 152 and 154 in series to the base of emitter-follower connected, NPN transistor 156 associated with control amplifier 110'. The midpoint between resistors 152 and 154 is also returned to the anode of Zener diode 140 by way of resistor 159. The collector of transisotr 156 is connected to the cathode of Zener diode 158, and its emitter is coupled to the inverting input of operational amplifier 110' (corresponding to amplifier 110 in FIG. 1) via resistor 160. Amplifier 110' may comprise a multistage differential operational amplifier circuit. Also, resistor 162 connects the inverting input of amplifier 110' to the movable tap of voltage adjustment potentiometer 108', having its outer terminals connected respectively to common bus 128 and the anode of Zener diode 164 in reference module 106. Potentiometer 108' corresponds to voltage adjustment means 108 in FIG. 1. The remaining input of operational amplifier 110' is coupled via resistor 168 to a reference point, and specifically to the cathode of diode 166 in reference module 106, wherein the anode of such diode is connected to the cathode of Zener diode 164.

The reference module 106 further includes a capacitor 167 disposed across Zener diode 164 and a resistor 165 between the cathode of diode 166 and the anode of Zener diode 164. Resistor 169 is interposed between the anode of Zener diode 164 and the output of three-phase rectifier 104. Each of the three-phase rectifiers 102 and 104 comprises a set of three diodes connected in a conventional manner to provide the polarities of output voltages indicated.

The operational amplifier 110' is further provided with a feedback circuit including resistor 170 shunted by capacitor 172, the cicuit having an integrating time constant such that the output of amplifier 110' is relative to the level of the AC voltage input present across shunt 118, but is substantially nonresponsive to the ripple or AC component of such voltage. The amplifier 110' derives its positive and negative power supply inputs from across a pair of Zener diodes, 158 and 174, connected in series between resistors 176 and 178, the latter coupling the Zener diode series circuit to the positive and negative outputs of rectifiers 102 and 104, respectively. Capacitor 180 is connected from the center tap between the Zener diodes to the positive output of rectifier 102, while capacitor 182 is located between the aforementioned Zener diode center tap and the output of negative rectifier 104. A diode 184 has its anode connected to the center tap between Zener diodes 158 and 174, while the cathode of diode 184 is connected to operational amplifier 110' at a point for clamping the circuit from ever providing a negative output. Thus, for example, the cathode of diode 184 may clamp the driver stage of the operational amplifier against negative excursions of input.

Amplifier 110' normally provides an output at terminal 186, but as the inverting input becomes more positive than the aforementioned reference voltage provided at the cathode of diode 166, the output of amplifier 110' decreases. Assuming normal current is flowing through shunt 118, then the input provided at the negative or inverting input of amplifier 110' will allow a substantial output at terminal 186. However, should the current through shunt 118 become excessive, amplifier 120' will provide an output for emitter-follower connected transistor 156 whereby the negative or inverting input of amplifier 110' causes a reduction in the output of amplifier 110' at terminal 186. Amplifier 110' never turns off entirely.

During normal operation, the output level at terminal 186 is determined by the setting of voltage adjustment potentiometer 108' which, as can be seen, selects a portion of a standard voltage across Zener diode 164.

As hereinafter discussed, a reduction of the output at terminal 186 causes phase-back in the operation of the silicon-controlled rectifiers, for instance silicon controlled rectifiers 68 illustrated for one phase of the circuit in FIG. 2. Control amplifier 80 is also illustrated in FIG. 2 for depicting phase-2 operation, and terminal 186 is connected thereto. Terminal 186 would also be connected to amplifiers 60 and 100, at points indicated by arrows 188, and it is understood the other circuit phases are substantially identical and work in a substantially similar manner to the one herein further described.

Firing circuit 80 includes a first NPN transistor 190 coupled to terminal 188 by means of a resistor 192. The emitter of transistor 190 is connected to common bus 128 via resistor 198 while its collector connects to the base of PNP transistor 194, the latter having its collector returned to common bus 128 via diode 196 disposed with its cathode oriented toward the collector of transistor 194.

The collector of transistor 190 is coupled to a power supply therefor which includes Zener diode 200 having its anode connected to common bus 128 and its cathode coupled to the non-neutral terminal of transformer winding 36 via capacitor 202 and resistor 204 in series. Diode 206, together with resistor 208 and variable resistor 210 all in series, are interposed between the cathode of Zener diode 200 and the collector of transistor 190, while a resistor 210 is located between the cathode of Zener diode 200 and the emitter of transistor 194. As positive voltage half-cycles appear across winding 36, capacitor 202 couples the same via resistor 204 to Zener diode 200 where these half-cycles are severely clipped, the Zener diode having a fairly low voltage drop compared with the voltage available. Consequently, transisotrs 190 and 194 are empowered substantially during each positive phase-2 half-cycle. During negative voltage half-cycles, a diode 212, interposed between common bus 128 and the junction of capacitor 202 with resistor 204, prevents application of a substantially negative voltage to Zener diode 200.

Therefore, assuming a reasonable input voltage at terminal 186, transistor 190 will provide a collector voltage during each phase-2 positive half-cycle which turns on transistor 194 at the same time, and delivers a positive voltage across back-biased diode 196. This voltage charges capacitor 214 via resistor 216. When the phase-2 voltage from transformer 10 is applied to silicon controlled rectifiers 68 and diodes 72 becomes negative, a circuit comprising resistor 218 in series with diode 220 located between the collector of transistor 194 and winding 20, discharges capacitor 214, with the collector of transistor 194 being clamped to ground by means of diode 196. The connection of resistor 218 and diode 220 advantageously prevents charging of capacitor 214 until a positive voltage, as actually applied across silicon controlled rectifiers 68, actually crosses the zero axis in a positive direction. Zener diode 200 is operative to provide full voltage to the circuit comprising transistors 190 and 194 in advance of a time when the circuit comprising resistor 218 and diode 220 allows charging of capacitor 214.

The firing circuit 80 further includes a unijunction transistor 222 having a first base returned to common bus 128 through resistor 224 and a second base coupled to the cathode of Zener diode 200 by way of resistor 226. The emitter electrode of transisotr 222 is coupled to the junction between capacitor 214 and resistor 216. A diode 228 joins the first base of transistor 222 to the gate of triggering silicon controlled rectifier 230 having its gate electrode returned to its cathode via resistor 232. A circuit comprising resistor 234, diode 236, and capacitor 238, in series, provides a positive anode voltage for silicon controlled rectifier 230, with the anode of the silicon controlled rectifier being connected to the junction between the cathode of diode 236 and capacitor 238. Capacitor 238 is charged through resistor 234 and diode 236 for turning on hard the triggering silicon controlled rectifier 230 when the latter receives an input at its gate electrode.

Figure 3:
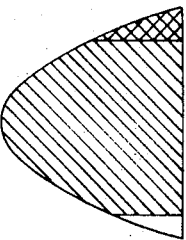
FIG. 3 is an illustration of a half-cycle of rectified current, depicting operation of the FIG. 2 circuit.

During each positive half-cycle delivered at the anodes of silicon controlled rectifier 68, capacitor 214 will charge positively and trigger conduction in unijunction transistor 222. When unijunction transistor 222 conducts, a positive voltage with respect to common bus 128 is developed across resistor 224 which triggers silicon controlled rectifier 230 via diode 228. A triggering pulse is applied through silicon controlled rectifier 230 to bus 76, to which the cathode of silicon controlled rectifier 230 is connected, as capacitor 238 discharges, thereby triggering conduction of silicon controlled rectifiers 68 via current sharing resistors 78. The time during each positive half-cycle at which triggering thereof occurs is, of course, dependent upon how fast capacitor 214 charges for triggering operation of unijunction transistor 222. Charging of capacitor 214 is in turn dependent upon the output of operational amplifier 110' at terminal 186. Normally, the movable contact of potentiometer 108' will be set so that capacitor 214 charges rapidly and triggers unijunction transistor 222 quite early in each positive half-cycle applied to silicon controlled rectifiers 68. For instance, in FIG. 3, illustrating a positive half-cycle of SCR 68 voltage, the shaded region illustrates the portion of such half-cycle during which an SCR 68 might well be conductive in supplying usual output current. Of course, the desired output current can be set by adjustment of potentiometer 108'. However, with increasing current through shunt 118, e.g. in a range above desired or rated output current for the circuit, the output of operational amplifier 120' will cause operational amplifier 110' to lower its output voltage at terminal 186, thereby delaying the charging of capacitor 214 toward a voltage sufficient for triggering operation of unijunction transistor 222, and thereby delaying or phasing back the triggering of silicon controlled rectifiers 68 in order to reduce the output current during each positive voltage half-cycle applied thereto. Operational amplifier 110' can be operated such that substantially no current limiting takes place for rated output current of the power supply. On the other hand, the output level of amplifier 120' at which its non-linear operation is just reached (i.e. at the knee of the curve in FIG. 4), should be determined such that nearly maximum SCR phase-back will be produced at that time, via the coupling of the output of amplifier 120' to amplifier 110'. This phase-back should not render the SCR's non-conducting, but will rather permit them to conduct for a short time during each positive half-cycle as illustrated by the double shaded or cross hatched region in FIG. 3. Therefore, potentiometer 108' should not be set to a point precluding SCR conduction when amplifier 120' reaches its non-linear operating region, i.e. at the point when circuit 134,136 conducts.

The non-linear feedback circuit, comprising resistor 134 in series with diode 136, is designed to limit the gain of amplifier 120' after the above-mentioned nearly maximum phase-back point is reached. A very low load impedance representing a crow-bar condition tending to cause a very high current through shunt 118 in a second or fault current range will thus produce a voltage at the input of operational amplifier 120' exceeding the linear operating range thereof and causing conduction of this non-linear feedback circuit 134,136. The actual value of load current at which non-linear operation is reached (such value being substantially the same as the value at which nearly maximum phase-back is reached) is determined by the setting of tap 124 of potentiometer 122. Current limiting and phase-back will continue to take place in the higher range, but to a lesser degree, whereby phase-back to zero degrees or shut-off of silicon controlled rectifier 68 desirably never takes place. The circuit will therefore not saturate or turn off, or oscillate, but is found suitable to limit crow-bar shorts and the like without complete disruption of power supply operation. Thus, the main circuit breakers or system fuses need not remove the circuit from the line, but limiting will take place until the overload is removed, at which point the circuit will revert to normal, rated output current operation. Since saturation of the circuit and shut-off of the silicon controlled rectifiers for the next cycle is avoided, the present circuit does not "lose control" under heavy load conditions.

While I have shown and descirbed a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a power supply circuit adapted to supply heavy direct current loads from an alternating current input source,
   control valve means coupled between the alternating current input source and a said load, said control valve means having gating electrode means for normally operating said control valve means to provide unilateral conduction therethrough during a time when the alternating input to the control valve means has a given polarity,
   sensing means for detecting current to said load,
   and circuit means responsive to said detected load current in a first high current range for controlling said gating electrode means of said control valve means to limit such load current in a first range thereof by operating said control valve means later during the said alternating input of said given polarity, the said circuit means having nonlinear properties for reducing the response of said circuit means to predetermined high current values in a second and higher range,
   said circuit means comprising a first operational amplifier responsive to the input of said sensing means and operative at least above a given input level to provide an amplifier output, said operational amplifier having nonlinear feedback means operative above a second and higher input level to provide negative feedback in said operational amplifier for reducing the gain of said operational amplifier, a second operational amplifier receiving the output of the first, said second operational amplifier having a time constant feedback circuit rendering the same responsive to the level of input provided thereto, charging means and triggerable means operated thereby for triggering said control valve means, and means operable during positive alternating current half-cycles for charging said charging means at a rate determined by the output of said operational amplifier.

2. The circuit according to claim 1 further including means for discharging said charging means except when the voltage across said control valve means has a given polarity.

3. The circuit according to claim 2 wherein said means for discharging includes a unilateral conducting means.

* * * * *

UNITED STATES PATENT OFFICE
CERTIFICATE OF CORRECTION

Patent No. 3,746,964                            Dated July 17, 1973

Inventor(s) William V. Guyton

It is certified that error appears in the above-identified patent and that said Letters Patent are hereby corrected as shown below:

Column 3, line 29, "togetehr" should be --together--.

Column 3, line 58, "togetehr" should be --together--.

Column 5, lines 15 and 16, "curents" should be --currents--.

Column 5, line 57, "proprotion" should be --proportion--.

Column 9, line 21, "140" should be --104--.

Column 9, line 35, "transisotr" should be --transistor--.

Column 11, line 4, "transisotrs" should be --transistors--.

Column 11, line 35, "transisotr" should be --transistor--.

Column 12, line 67, "descirbed" should be --described--.

Column 14, line 18, after "said" insert --second--.

Signed and sealed this 18th day of December 1973.

(SEAL)
Attest:

EDWARD M. FLETCHER, JR.           RENE D. TEGTMEYER
Attesting Officer                 Acting Commissioner of Patents